United States Patent [19]
Taylor

[11] 3,843,289
[45] Oct. 22, 1974

[54] APPARATUS FOR TRANSFER MOLDING THERMOSETTING MATERIALS

[76] Inventor: Don A. Taylor, 216 Mill St., Wadsworth, Ohio 44281

[22] Filed: July 9, 1973

[21] Appl. No.: 377,514

Related U.S. Application Data

[62] Division of Ser. No. 167,240, June 29, 1971, Pat. No. 3,748,075.

[52] U.S. Cl.......... 425/145, 425/147, 425/DIG. 228
[51] Int. Cl............................................... B29 3/06
[58] Field of Search.......... 425/251, DIG. 228, 145, 425/147, 252, 242, 243, 244, 258, 260, 289, 290, 298, 250

[56] References Cited
UNITED STATES PATENTS

| | | | |
|---|---|---|---|
| 2,551,439 | 5/1961 | Kovacs............................ | 425/251 X |
| 3,004,290 | 10/1961 | Toulmin.......................... | 425/242 X |
| 3,121,918 | 2/1964 | Jurgeleit........................... | 425/190 |
| 3,189,945 | 6/1965 | Strauss............................ | 425/251 X |

Primary Examiner—Francis S. Husar
Assistant Examiner—David B. Smith

[57] ABSTRACT

An improved apparatus for molding thermosetting material, such as strips of uncured mill rubber or other thermosetting elastomers, includes a preheater assembly which preheats the thermosetting material to a temperature which is below its curing temperature. A movable pot receives at least a portion of a charge of the preheated strip material at a loading station. The pot is then moved to a discharge or unloading station where a ram assembly is extended to force the thermosetting material from the pot into a mold. The ram assembly is then retracted and the pot is returned to the loading station. The pot is then filled so as to contain a charge which includes both preheated strip material and thermosetting material which was not forced into the mold on the previous cycle of operation. The pot is cooled at the loading station to maintain thermosetting material in the pot at a temperature below its curing or setting temperature. As the pot is being loaded, a slide block applies pressure against the mold and heats the thermosetting material in the mold to a temperature above its setting temperature.

13 Claims, 14 Drawing Figures

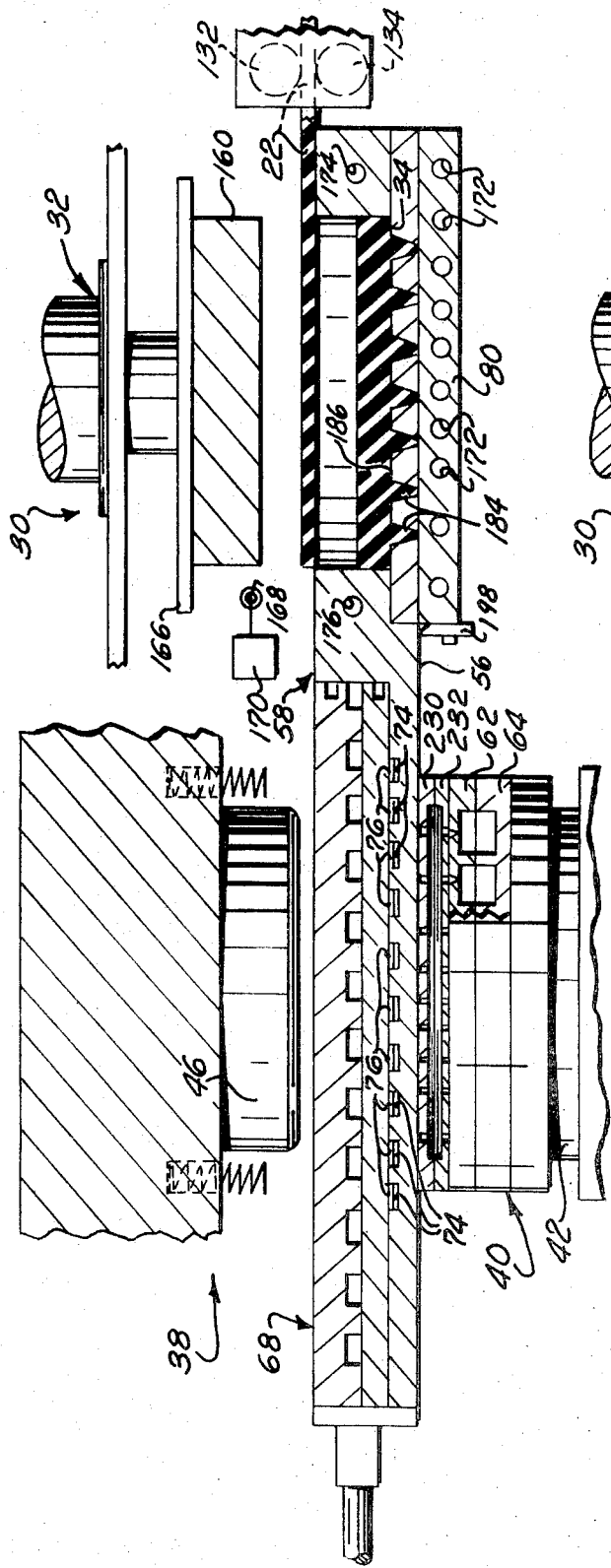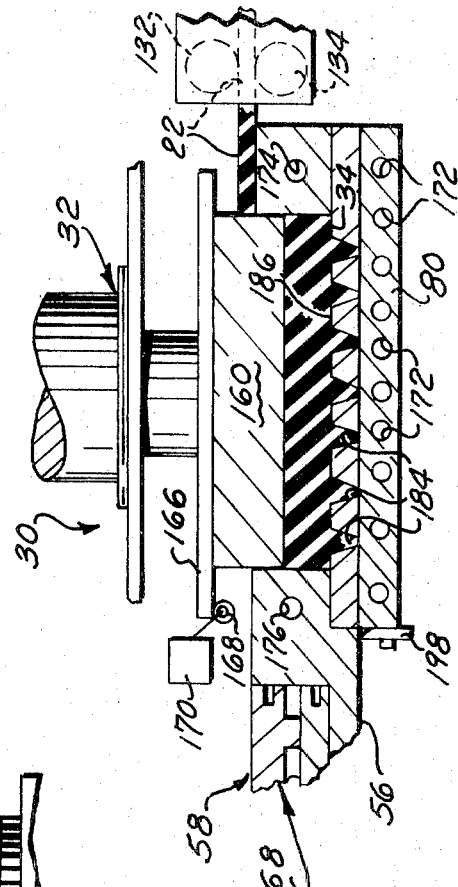
FIG. 5
FIG. 6

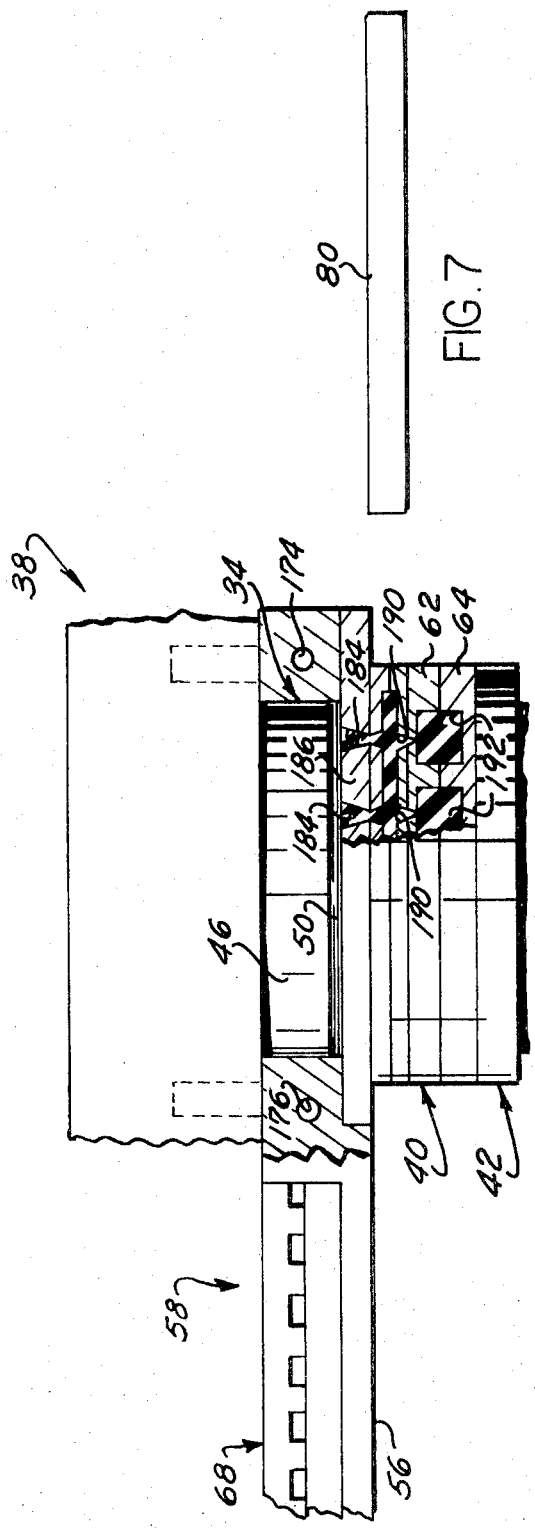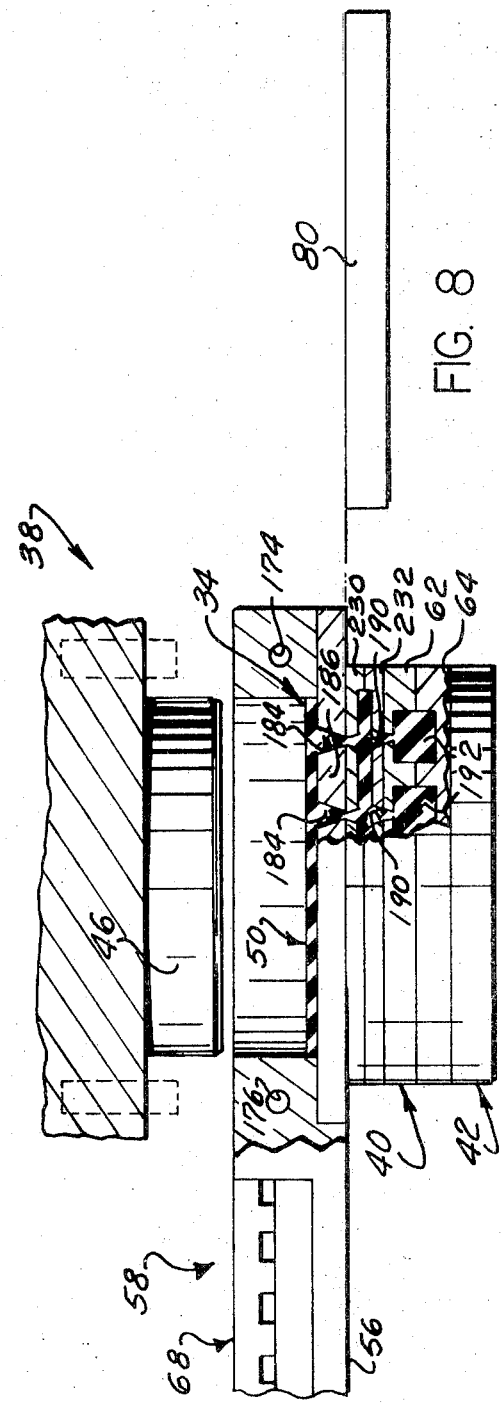

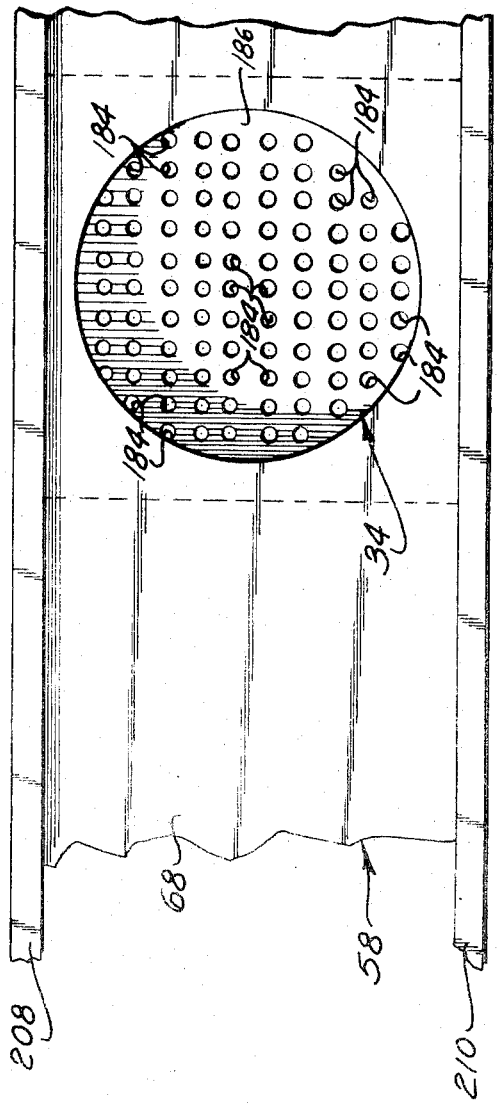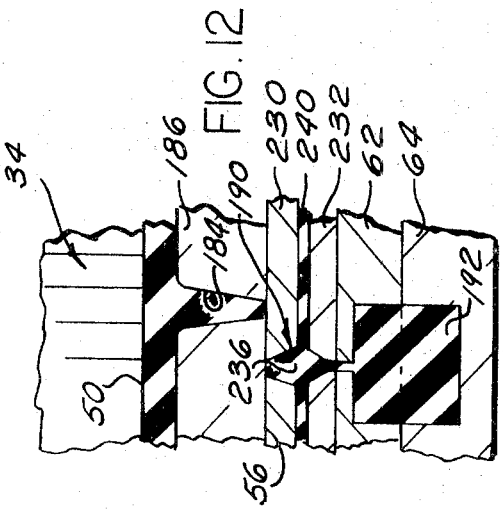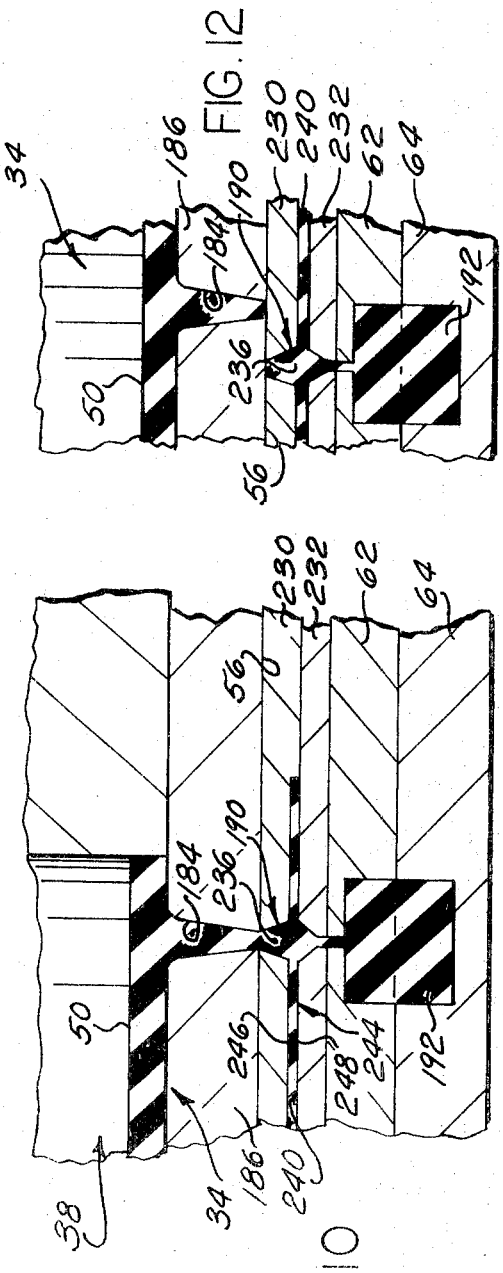

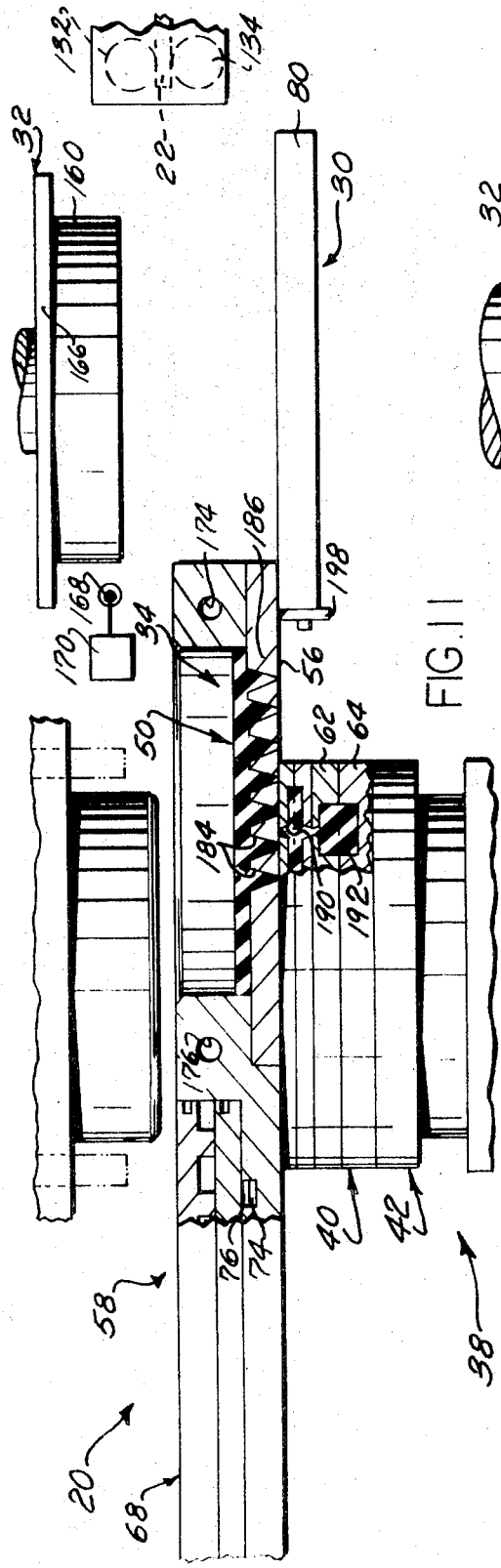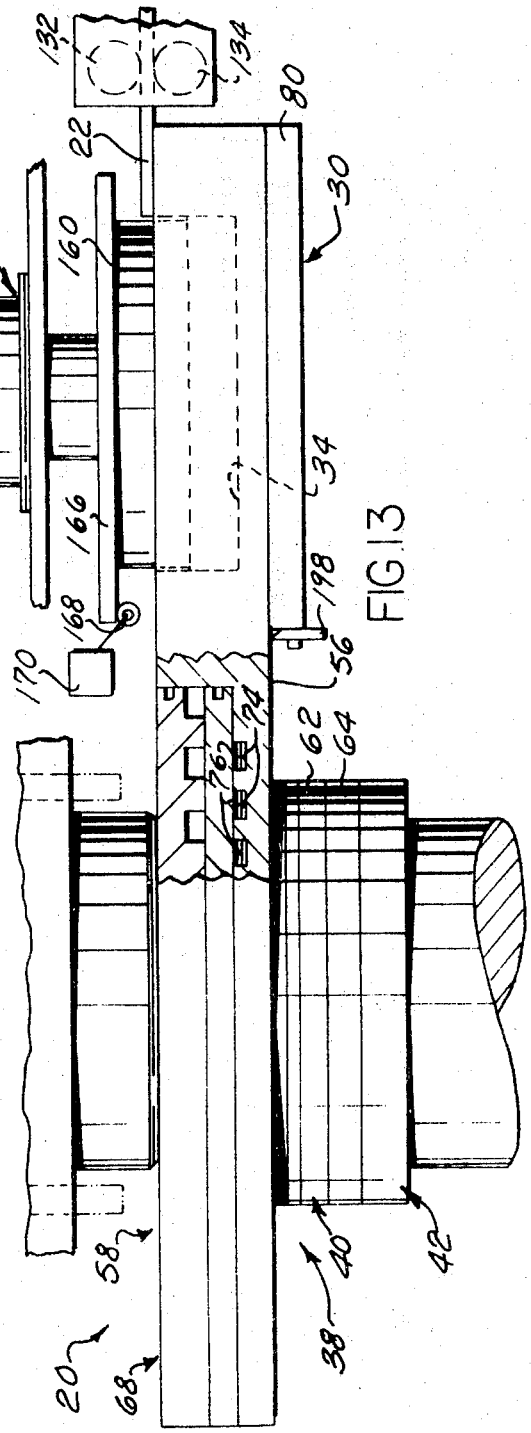

APPARATUS FOR TRANSFER MOLDING THERMOSETTING MATERIALS

This is a divisional of application Ser. No. 167,240 filed July 29, 1971, now U.S. Pat. No. 3,748,075.

The present invention relates to an improved apparatus and method for forming articles of a thermosetting material.

There are three types of molding machines which are in frequent commercial use, namely a compression press or machine, a transfer press or machine, and an injection press or machine. When rubber or plastic articles are made with a compression press, non-cured blanks formed of a predetermined volume of thermosetting material are loaded into cavities in a mold which is then subjected to heat and pressure for a time sufficient to set, i.e., cure, the thermosetting material. This molding method has a number of advantages, including relatively low cost of the press and molds and a high level of efficiency and dependability since the press is nonautomated. The drawbacks of the compression molding process include relatively high labor operating cost, long cure periods, and a relatively high material waste factor.

Transfer molding machines or presses have the advantage that parts can be molded with relatively little flash material. This is possible due to the fact that the molds in the press can be clamped tightly together before the transfer of material into the mold. Another advantage of the transfer molding press or machine is that it has a relatively low labor cost in that a blank of thermosetting material can be loaded into a pot instead of being precut and manually placed in a mold cavity as is the case with a compression molding press. However, transfer molding has substantial disadvantages in that there are relatively high labor costs involved in the preparation of the blanks of raw material for the press. In addition, there is a relatively high material waste or scrap factor due to the fact that the material is relatively cold when it is introduced into a relatively hot mold cavity which may result in premature curing or setting of a skin surface. Another disadvantage of transfer molding is that the required cure period is relatively long due to the fact that the thermosetting material is introduced into the mold at a relatively low temperature.

Injection molding machines differ from compression and transfer molding presses in that the material is preheated and injected under high pressure into a mold cavity. This enables injection molding machines to overcome many of the disadvantages associated with compression and transfer molding. However, injection molding machines have a relatively large waste or scrap factor due to a curing of material in a nonreuseable runner system. Another disadvantage of the injection molding machines is the inability, for certain articles at least, to design a runner and gate system that will efficiently feed the mold cavity in a uniform manner. Another disadvantage of injection molding machines is the limit on material capacity which can be injected on an operating cycle due to the poor ability of rubber and other thermosetting materials to absorb or conduct heat necessitating the provision of a relatively large reserve of preheated material which may cure prematurely.

Accordingly, it is an object of this invention to provide a new and improved apparatus and method for molding elastomeric materials which provide the advantages of compression, transfer, and injection type molding machines without the disadvantages which are associated with these machines and, more specifically, to provide molding apparatus and method which with a minimum of waste can utilize relatively low cost raw material which has not been pre-processed or formed into blanks and which include the use of a relatively inexpensive mold which does not have a complicated runner and gate feeding arrangement.

Another object of this invention is to provide a new and improved apparatus for molding thermosetting material where the apparatus is relatively simple in construction and lends itself to repetitive quality operation with a minimum of supervision and waste.

Another object of this invention is to provide a new and improved apparatus for forming molded articles from strip material wherein the apparatus includes a preheater assembly for preheating the strip material, a pot for receiving a charge of the preheated strip material, and a ram or similar means for pressurizing a charge in the pot to force at least a portion of the charge to flow from the pot into the mold.

Another object of this invention is to provide a new and improved apparatus for molding a thermosetting material and wherein the apparatus includes a mold assembly formed by a plurality of relatively movable parts and having an entrance opening to a mold cavity, a movable pot for holding a charge of the thermosetting material, an assembly for moving this pot between a loading position and an unloading position on which the pot is effective to retain the parts of the mold assembly against movement and material can be forced from the pot into the mold cavity, wherein a device is provided for applying heat and pressure to the mold assembly upon movement of the pot from the unloading position to the loading position to retain the parts of the mold assembly against movement relative to each other and to promote a setting, i.e., curing, of the thermosetting material in the mold assembly.

Another object of this invention is to provide a cyclically operable apparatus for forming molded articles from a thermosetting material and wherein the apparatus includes a pot for holding a charge of the thermosetting material, a loader assembly for loading at least a portion of a charge of the thermosetting material into the pot during each operating cycle of the apparatus, and a control assembly for detecting when the portion of a charge remaining in the pot at the end of one cycle of operation of the apparatus and the thermosetting material added to the pot during a next succeeding cycle of operation of the apparatus equals a charge of a predetermined magnitude and for interrupting operation of the loader assembly in response to the detecting of a charge of the predetermined magnitude in the pot.

Another object of this invention is to provide a new and improved apparatus for use in molding thermosetting material and wherein the apparatus includes a pot for holding a charge of the thermosetting material and a cooling assembly at a pot loading station for maintaining thermosetting material in the pot at a temperature below the setting temperature of the thermosetting material.

Another object of this invention is to provide a new and improved method of forming molded articles from thermosetting strip material wherein the method includes the steps of providing a strip of thermosetting material, preheating at least a portion of the strip of thermosetting material to a temperature below its setting temperature, loading a charge of the preheated thermosetting strip material into a pot, and forcing at least a portion of this charge to flow from the pot into a mold.

Another object of this invention is to provide a new and improved method of molding thermosetting material and wherein the method includes the steps of providing a mold assembly, providing a pot which is movable between a loading position at which the thermosetting material is placed into the pot and an unloading position at which the thermosetting material is forced to flow from the pot into the mold assembly, and wherein pressure is applied to the mold assembly after movement of the pot to the loading position.

Another object of this invention is to provide a new and improved method for molding thermosetting material during a plurality of operating cycles wherein the method includes the steps of providing a pot, loading the pot with at least a portion of a predetermined charge of the thermosetting material during each of a plurality of operating cycles, forcing a portion of the predetermined charge of the thermosetting material to flow into the mold and retaining another portion of the predetermined charge in the pot during each of the plurality of operating cycles, detecting during a loading of a pot when the retained portion of a charge remaining in the pot at the end of one of the operating cycles and the thermosetting material added to the pot during the loading of the pot on the next succeeding operating cycle equals the charge of predetermined magnitude, and interrupting the loading of the pot during each of the operating cycles upon detection of a charge of the predetermined magnitude in the pot.

These and other objects and features of the invention will become more apparent upon a consideration of the following description taken in connection with the accompanying drawings, wherein:

FIG. 5 is an enlarged fragmentary schematic elevational view, taken generally along the line 5—5 of FIG. 2, illustrating the relationship between a movable pot, loading assembly, mold, slide block for heating and applying pressure to the mold, and fixed and movable rams of the molding apparatus of FIG. 1;

FIG. 6 is a fragmentary schematic elevational view, similar to FIG. 5, of the loading of strip material into the pot by the loading assembly as the pot is cooled;

FIG. 7 is a fragmentary schematic elevational view depicting the forcing of material from the pot into the mold;

FIG. 8 is a schematic fragmentary elevational view, similar to FIG. 7, depicting the pot after a major portion of a charge has been forced from the pot and a minor portion of a charge remains in the pot;

FIG. 9 is a fragmentary plan view, taken generally along the line 9—9 of FIG. 1, illustrating the arrangement of a plurality of discharge openings in the bottom of the pot;

FIG. 10 is an enlarged fragmentary schematic view illustrating the forcing of material through the discharge openings in the pot and into the mold;

FIG. 11 is a schematic fragmentary elevational view, depicting movement of the pot from the unloading position of FIGS. 7 and 8 toward the loading position of FIG. 5 with a minor or remaining portion of a charge in the pot;

FIG. 12 is an enlarged fragmentary view, generally similar to FIG. 10, illustrating the relationship between the mold and the pot upon initial movement of the pot toward the loading position;

FIG. 13 is a schematic elevational view, generally similar to FIGS. 5 and 11, depicting the application of heat and pressure to the mold by the slide block during loading of the pot.

Figure 1:
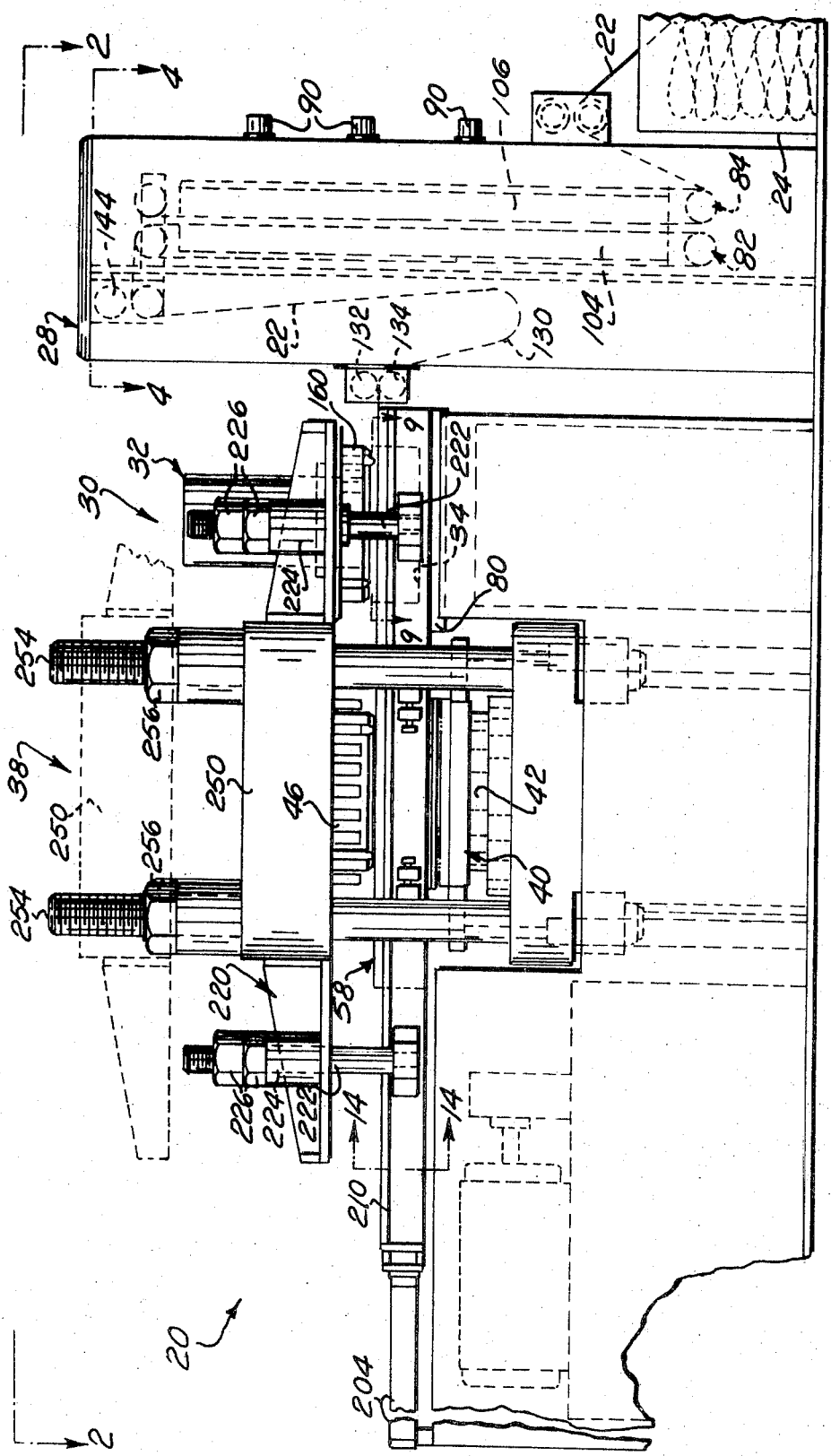
FIG. 1 is a partially broken away schematic illustration of a molding apparatus constructed in accordance with the present invention.

Although a molding apparatus 20 constructed in accordance with the present invention can be utilized to mold many different types of materials, it is illustrated in FIG. 1 in association with a thermosetting strip material 22 which is supplied from a suitable container 24. The thermosetting strip material 22 is preheated to a temperature which is below its setting, i.e., curing temperature in a preheater assembly 28 (see FIGS. 1–4). The preheated strip material is then conducted to a loading station 30 where a loader assembly 32 loads the strip material into a movable pot 34 (FIGS. 5 and 6).

When the movable pot 34 has been filled so as to contain a predetermined charge of the thermosetting material 22, the pot 34 is shifted from the loading station 30 to an unloading or dischrage station 38 where the pot overlies a mold 40 disposed on a movable ram 42 (FIG. 1). The movable ram 42 and mold 40 are then raised so that a fixed ram 46 telescopically enters the pot 34 (FIG. 7) to force a major portion of the thermosetting material in the pot 34 into the mold 40. The movable ram 42 is then retracted (FIG. 8) and the pot 34 is shifted from the loading station 38 to the unloading station 30 (FIG. 11) with a minor portion 50 of the thermosetting material remaining in the pot 34 to form an initial portion of a charge for a next succeeding cycle of operation of the molding apparatus 20.

After the pot 34 has returned to the loading station 30, the movable ram 42 is again raised to press a horizontally extending bottom surface 56 of a slide block 58 and pot 34 against the mold 40 (FIG. 13). This pressure holds upper and lower sections 62 and 64 of the mold tightly together so that the thermosetting material 22 does not leak out between the relatively movable sections of the mold. As the mold sections 62 and 64 are pressed together by the slide block 58 and the next succeeding charge of the thermosetting material is loaded into the pot 34, the thermosetting material in the mold sets. The curing of the material in the mold 40 is promoted by heater elements 74 disposed in passages 76 in the slide block 58. Since the pot 34 is also formed in the slide block 58, a cooling block or element 80 is provided at the loading station 30 to prevent the minor portion of the previous charge remaining in the pot 34 from being heated to a temperature above its setting temperature as additional thermosetting material is loaded into the pot.

Although it is contemplated that the molding apparatus 20 will be utilized to mold articles from strips of many different types of synthetic elastomers which are advantageously set with the application of heat, the molding apparatus 20 is advantageously utilized to mold articles from a strip 22 of uncured mill rubber. It should be noted that the strip 22 of raw mill rubber is utilized without being formed into blanks of a predetermined size, as is commonly done for compression and transfer molding, or being formed into a cylinder or pellets, as is often done for extrusion molding. Of course, this lack of processing of the strip rubber 22 before it is supplied to the molding apparatus 20 substantially reduces the material cost for the articles molded by the apparatus.

To reduce the curing time required to set the articles molded from the strip material 22 to their permanent configuration in the mold 40, the strip material 22 is heated to a temperature which is slightly below its setting (i.e., curing) temperature in the preheater assembly 28. To promote a rapid heating of the strip material 22 so that adequate material is available to provide a relatively large charge for immediate loading into the pot 34 during successive cycles of operation of the molding apparatus 20, the preheater assembly 28 includes a pair of heating platens 82 and 84 (FIG. 3). The platens 82 and 84 are pressed against opposite sides 86 and 88 of the strip material 22 under the influence of piston and cylinder assemblies 90 (see FIGS. 1 and 2). Thus, the heater platen 84 is connected with piston rods 94 (see FIGS. 3 and 4) and is movable toward and away from the fixed heater platen 82 by the piston and cylinder assemblies 90.

When a portion of the elastomeric strip material 22 to be heated is disposed between the platens 82 and 84 (as shown in FIG. 3), the piston and cylinder assemblies 90 are activated to press the platen 84 toward the platen 82. This results in a firm pressure contact between heating surfaces 98 and 100 (FIG. 3) of the platens 82 and 84 and the opposite surfaces 86 and 88 of the strip material 22 to promote the conduction of heat from the platens to the strip material. Heater cores 104 and 106 are provided in the platens 82 and 84. While it is contemplated that many different types of heating apparatus could be used, in the embodiment of the invention illustrated in FIG. 3, the cores 104 and 106 include electrical heating strips 110 and 112.

Once a length of strip material 22 disposed between the heater surfaces 98 and 100 of the platens 82 and 84 has been preheated to the desired temperature, the piston and cylinder assemblies 90 are deactivated to release the pressure applied to the strip material. Conveyor chains 116 and 118 on the platens 82 and 84 are then driven by sprockets 122 to move pivotally interconnected links 124 of the conveyor chains and feed the heated portion of the strip material 22 to a storage loop 130 (FIG. 1). The preheated strip material remains in the storage loop 130 until it is fed by rollers 132 and 134 to the loader assembly 32 as required during the loading of the pot 34. To maintain the material in the storage loop 130 at its preheated temperature, walls 138 (see FIG. 3) of the preheater assembly 28 are insulated so that the interior of the housing is at substantially the preheat temperature. The conveyor chains 116 and 118 are driven by a motor 142 (FIG. 4) which is connected with a feed roll 144 which is in turn connected with the sprockets 122 for the conveyors 116 and 118 by a chain 148. Although the platens 82 and 84 include conveyor chains 116 and 118 having links with flat hard surfaces which apply pressure against both sides of the strip material 22, it should be understood that other types of heating and conveying devices could be provided in the preheater assembly 28 if desired.

A charge comprising a predetermined volume of the strip material 22 is accumulated in the pot 34 during each cycle of operation of the molding apparatus 20. This charge includes the minor portion 50 (see FIG. 11) of the charge remaining in the pot from the last cycle of operation of the molding apparatus 20 and preheated strip material 22 added during the present cycle of operation of the molding apparatus. Thus, at the beginning of each cycle of operation of the molding apparatus 20, the pot 34 is returned to the loading station 30 with the remaining portion 50 of the last charge in the pot 34. A sufficient quantity of the strip material 22 is then deposited in the pot 34 by operation of the loader assembly 32 to accumulate a charge of a predetermined magnitude.

In the illustrated embodiment of the invention, the loader assembly 32 includes a movable ram 160 (see FIG. 5) which is extended telescopically into the pot 34 with a length of the strip material 22 overlying the pot 34 (FIG. 6). As the movable ram 160 enters the pot 34, the portion of the strip material 22 overlying the pot is severed and compressed into the other material in the pot. The ram 160 is then withdrawn from the pot and the strip material 22 is advanced by the feed rollers 132 and 134 so that a next succeeding portion of the strip material overlies the pot. The movable ram 160 is then lowered into the pot to again sever the end portion of the strip material 22 and compress the severed end portion into the material previously deposited in the port 34. It should be noted that the pressure with which the movable ram compresses the material in the pot 34 is sufficient to cause the strip material to flow against side surfaces of the pot so that the pot is completely filled ahead of the ram 160 when it is in the lowered position of FIG. 6.

When the minor portion of the material remaining in the pot 34 from the preceeding cycle of operation of the molding apparatus 20 and the strip material deposited in the pot by operation of the loader assembly 32 during the present cycle of operation of the molding apparatus 20 is equal to a charge of a predetermined magnitude, an actuator member 166 on the ram 160 will not be moved downwardly past an actuator 168 for a limit switch 170 to signal a suitable control circuit that the desired charge has been accumulated in the pot 34. Although the limit switch 170 has been shown schematically in FIGS. 5 and 6, it should be understood that the limit switch could be activated by the accumulation of a predetermined amount of material in the pot 34 or by movement of a drive piston for the ram 160. In any case, the position of the switch actuator 168 is adjustable to enable charges of different sizes to be accumulated in the pot 34 and articles of different sizes to be molded.

If the minor or remaining portion 50 of the previous charge is heated to a temperature above its curing temperature for a substantial period of time, or is scorched, this material cannot be used on the next succeeding cycle of operation of the molding apparatus 20 and is wasted. This remaining or minor portion 50 of the preceeding charge may be heated excessively by being momentarily exposed to a relatively high temperature while the major portion of the previous charge is being forced into the mold 40. The remaining or minor portion 50 of the charge could be heated excessively under the influence of heat transferred from the heating element 74 in the slide block 58 as the material in the mold 40 is cured and the pot 34 is loaded. Accordingly, the bottom surface 56 of the pot 34 rests on the cooling element or block 80 having coils 172 through which a suitable refrigerant is circulated (see FIGS. 5 and 6). By using the cooling element 80, a substantial reduction in waste material is achieved over a known molding device.

While it is important to provide the cooling element or block 80 to prevent the material in the pot 34 from being overheated, it is also desirable to maintain the material in the pot at a temperature closely approximating the preheat temperature. Accordingly, auxiliary heaters 174 and 176 are proviced in the slide block 58 to maintain the material in the pot 34 at substantially the preheat temperature. Suitable sensing devices are associated with the auxiliary heaters 174 and 176 and the cooling element 80 to detect the temperature of the material in the pot and regulate the operation of the cooling element and auxiliary heaters so that the material is neither cooled to too low a temperature or heated to too high a temperature.

After a charge of a predetermined magnitude has been loaded into the pot 34 and the articles molded on the previous cycle of operation have been removed from the mold 40, the pot is shifted from the loading station 30 to the unloading station 38. At the unloading station 38, discharge openings 184 in a bottom plate 186 (see FIG. 9) of the pot 34 are aligned with entrance passages or sprews 190 leading to mold cavities 192 (FIG. 10). Since the discharge openings 184 in the bottom plate 186 of the pot 34 are aligned with the entrance passages 190 to the mold cavities 192, a major portion of the charge in the pot 34 can be forced through the discharge openings and entrance passages into the mold cavities when the lower ram 42 is raised and the fixed ram 46 enters the pot 34 (see FIGS. 7 and 10). The bottom plate 186 is removable to enable a bottom plate (not shown) having a different number and arrangement of discharge openings to be substituted for the bottom plate 186. This enables existing molds having sprue passage arrangements which are different from that of the mold 40 to be utilized.

After the major portion of the charge in the pot 34 has been forced through the discharge openings 184 into the mold 40, the movable ram 42 is lowered so that the slide block 58 is clear of the fixed ram 46 (see FIG. 8). The slide block 58 is then moved to the right (as viewed in FIG. 8) through the intermediate position of FIG. 11 to the loading position of FIG. 13 with the minor portion 50 of the charge remaining in the pot 34. Upon initial movement of the pot 34 toward the loading position, thermosetting material extending between the mold passages 190 and the discharge openings 184 is severed in the manner illustrated in FIG. 12. As the bottom 56 of the pot 34 is moved relative to the mold 40, the passages 190 to the mold cavities 192 are sealed by the bottom surface 56 of the slide block 58 (FIG. 5) which moves over the mold 40.

During movement of the pot 34 toward the loading station 30, a scraper blade 198 (see FIG. 11) engages the bottom surface 56 of the slide block and scrapes any material protruding out of the passages 184 from the bottom of the slide block 58. If desired, a movable knife blade could be provided between the slide block 58 and the mold 40 to sever the material extending from the pot discharge passages 184 to the mold passages 190. Of course, this knife blade would scrape away any material adhering to the bottom of the slide block 58.

Figure 2:
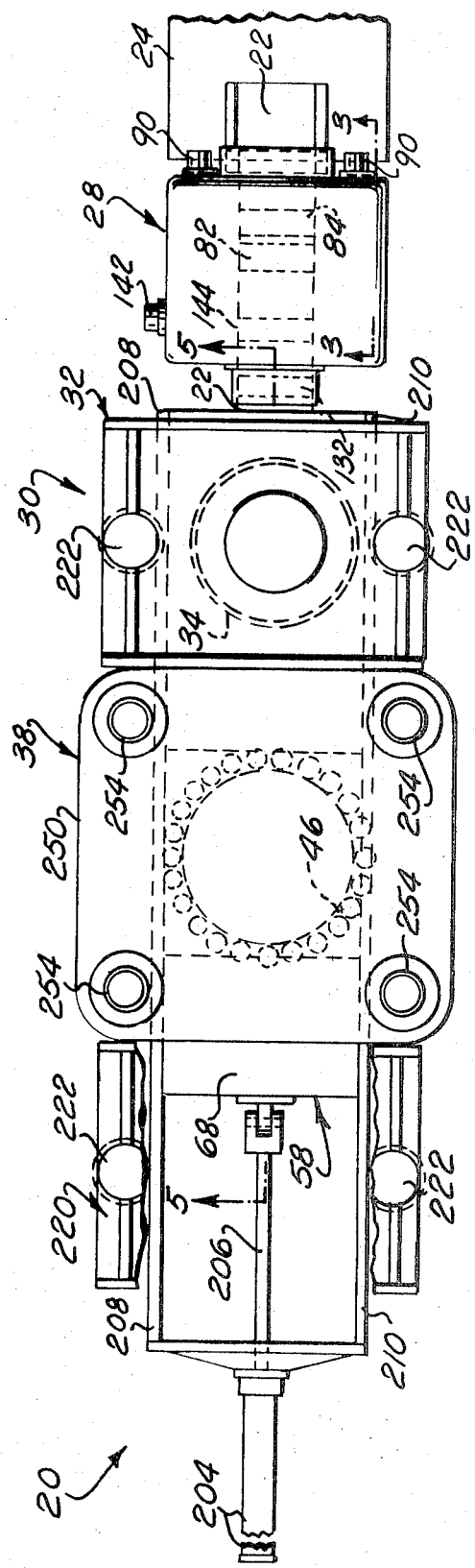
FIG. 2 is a fragmentary schematic illustration taken generally along the line 2—2 of FIG. 1 and further illustrating the construction of the molding apparatus.
Figure 14:
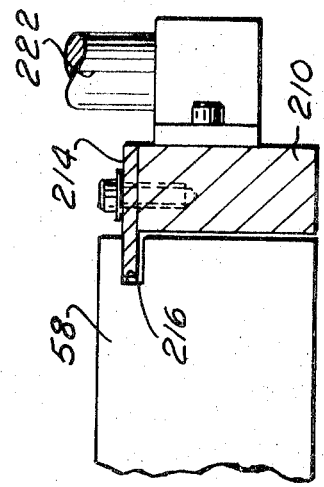
FIG. 14 (on sheet two of the drawings) is a schematic sectional view, taken generally along the line 14—14 of FIG. 1, illustrating the relationship between a guide rail and the slide block.
Figure 4:
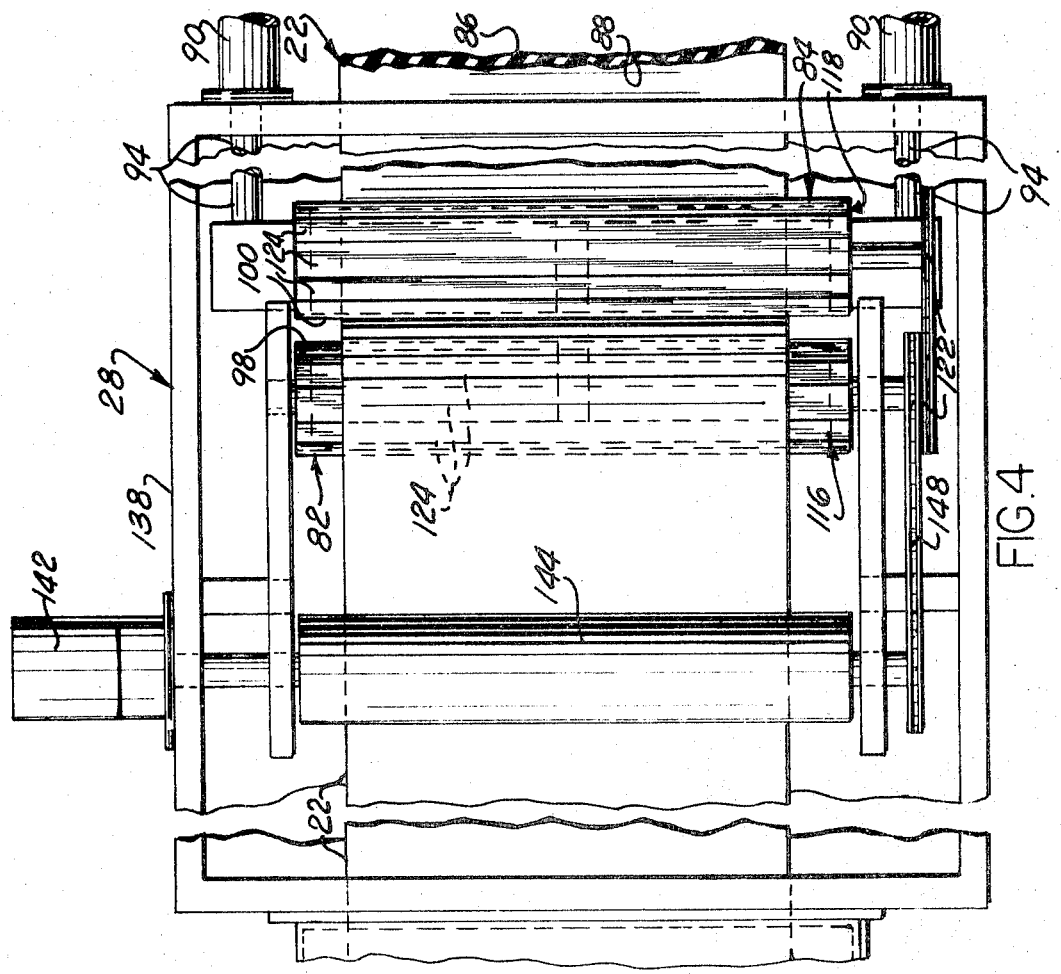
FIG. 4 is a fragmentary plan view, taken generally along the line 4—4 of FIG. 1, further illustrating the construction of the preheater assembly.
Figure 3:
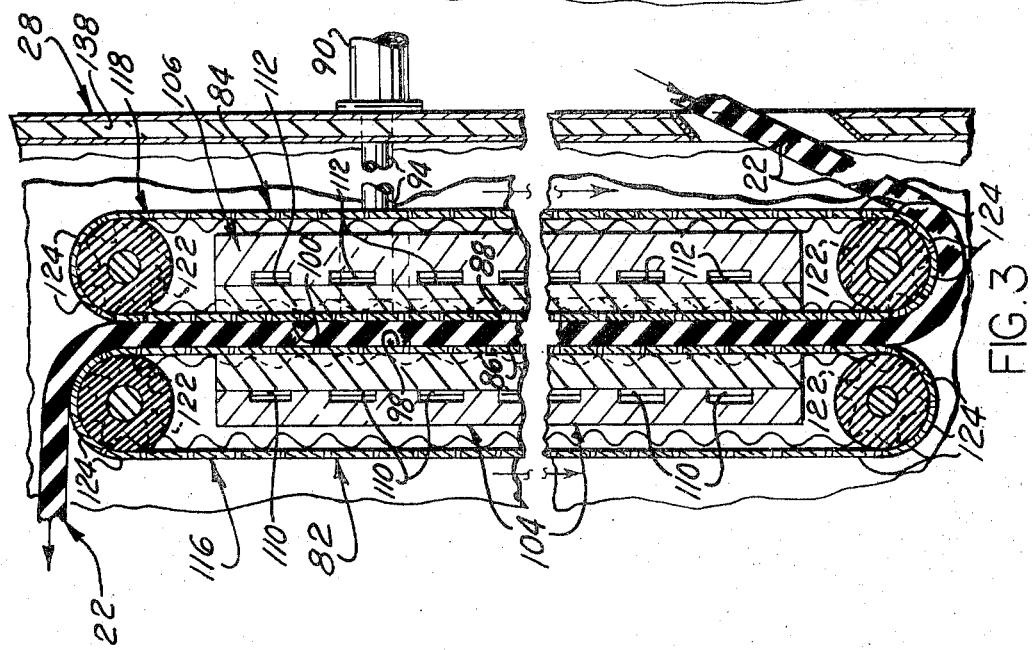
FIG. 3 is an enlarged fragmentary sectional view, taken generally along the line 3—3 of FIG. 2, illustrating the construction of a preheater assembly for preheating strip material.

The slide block 58 may be moved relative to the loading and unloading stations 30 and 38 by means of a mechanically actuated piston and cylinder assembly 204 (see FIGS. 1 and 2). When the piston and cylinder assembly 204 is retracted, a piston rod 206 (FIG. 2) moves the slide block 58 toward the left (as viewed in FIG. 2) to move the pot 34 from the loading position to the unloading position. This movement of the slide block 58 is guided by a pair of parallel rails 208 and 210 which are disposed on opposite sides of the molding machine (see FIG. 2) and extend for substantially the entire length of the molding machine. To operatively interconnect the guide rail 210 and slide block 58, a plate 214 (FIG. 14) mounted on the guide rail extends into a groove 216 formed in the slide block 58. Of course, the guide rail 208 is connected with the slide block 58 in a similar manner.

When the movable ram 42 and mold 40 are raised, the slide block 58 and pot 34 are also raised (see FIGS. 11 and 13). To enable the slide block 58 to move upwardly with the movable ram 42, the guide rails 208 and 210 are movably connected with a fixed frame 220 (FIG. 1) of the molding apparatus 20 by vertical support bars 222 which are slidably received in sleeves 224 connected to the frame. Therefore, upon upward movement of the movable ram 42, the support bars 222 slide upwardly relative to the sleeves 224. Adjustable stop nuts 226 are connected with the support bars 222 to limit the downward movement of the guard rails 208 and 210 upon retraction of the movable ram 42. To maintain the bottom surface 58 of the pot 34 in contact with the cooling block 80 while pressure is being applied to the mold 40 by slide block 58, the cooling block extends between and is connected to the guide rails 208 and 210.

Once the thermosetting material in the mold cavities 192 and passages 190 has set, the excess material remaining in the mold passages 190 must be stripped away from the article in the mold cavity. To facilitate removing this excess material, a pair of plates 230 and 232 (see FIG. 10) are provided between the upper mold section 62 and the slide block 58. The plate 230 is hingedly connected with the plate 232 so that it can be raised and moved away from the plate 232 after the mold 40 has been moved out from under the slide block 58. Upon raising the plate 230, sprue material 236 in the passages 190 is readily accessible and can be removed from the lower plate 232 by pulling upwardly on a thin sheet 240 of flash material which extends between the sprews associated with the openings 190 to the mold cavities 192.

To minimize waste material, the plates 230 and 232 limit the formation of the flash sheet 240 to a relatively small predetermined thickness. By providing a predetermined thickness and extent of the flash sheet 240, the waste material in the flash can be minimized while still providing sufficient strength to enable the sprew material 236 to be stripped from the mold 40. To provide for a flash sheet of a predetermined thickness, a flat thin cavity 244 is formed between parallel surfaces 246 and 248 of the plates 230 and 232. These surfaces form the flash 240 of the same thickness and extent during each molding operation so that the amount of flash and waste material can be minimized while still providing sufficient flash to enable the sprue material 236 to be stripped from the mold.

Under certain operating conditions it is contemplated that the mold 40 will be moved transversely outwardly from between the fixed and movable rams 42 and 46. However, under other operating conditions it is contemplated that it may be desirable to lower the movable ram 42 to such an extent that the mold 40 can be opened while remaining on the movable ram. If the mold 40 is to be opened while remaining on the movable ram 42, a relatively large clearance must be provided between the mold 40 and the slide block 58 when the movable ram 42 is fully retracted. To provide for this relatively large clearance, the frame 120 includes a support section 250 (see FIG. 1) which is movable from the operating position shown in solid lines in FIG. 1 to the operating position shown in dashed lines in FIG. 1. The fixed ram 46 is secured to the frame section 250 so that upon movement of the frame section to the dashed line position of FIG. 1, a relatively large clearance is provided between the fixed ram 46 and movable ram 42. To enable the frame section 250 to be moved to the dashed line position, the frame section is connected to support columns or posts 254 having threaded upper end portions by means of releasable lower clamp sections (not shown) and nuts 256. Of course, if the frame section 250 could be releasably connected to the support post 254 in any desired manner.

From the foregoing description, it can be seen that the molding apparatus 20 combines the advantages of compression, transfer and injection type molding without the disadvantages which are frequently associated with these machines. Thus, elastomeric strip material 22, such as rubber, can be molded in relatively inexpensive molds with a minimum of waste without the provision of a relatively complicated sprue and gate arrangement which is difficult to feed. The molding apparatus 20 can be operated at a relatively high speed since the strip material 22 is quickly heated in the preheater 28 and transferred to the pot 34 while material which was forced into the mold 40 on the previous cycle of operation is being cured. To minimize waste material, a relatively small or minor portion 50 of a charge from one cycle of operation forms a part of the charge for the next cycle of operation of the molding apparatus. To prevent this remaining material from being overheated, a cooling block 80 cools the pot 34 while it is being loaded with preheated strip material by operation of the lower assembly 32. The minimization of waste is also promoted by the mold assembly 40 which includes plates 230 and 232 for providing flash 240 of a predetermined thickness on each cycle of operation of the molding apparatus. Relatively high speed economic operations of the molding apparatus 20 is also promoted by the slide block 58 which applies heat and pressure to the mold 40 while the pot 34 is being charged with the preheated strip material 22.

Having described a specific preferred embodiment of the invention, the following is claimed:

1. A cyclically operable apparatus for forming molded articles from thermosetting material, said apparatus comprising pot means for holding a charge of the thermosetting material, said pot means having at least one discharge opening through which the thermosetting material may pass from said pot means into a mold, loader means for loading at least a portion of a charge of the thermosetting material into said pot means during each cycle of a plurality of cycles of operation of said apparatus, said loader means being located at a loading station, means for forcing a portion of a charge of the thermosetting material to flow through said discharge opening and for enabling another portion of the charge to remain in said pot means during each cycle of a plurality of cycles of operation of said apparatus, said means for forcing a portion of a charge to flow through said discharge opening being located at an unloading station spaced from said loading station, means for moving said pot means between said loading and unloading stations on each cycle of operation of said apparatus, movable heater means for applying heat to the thermosetting material in the mold, said means for moving said pot means between said loading and unloading stations including means for moving said heater means from an inactive position in which said heater means is disposed to one side of said unloading station to an active position in which said heater means is located at said unloading station adjacent to the mold simultaneously with movement of said pot means from the unloading station to the loading station to enable said heater means to heat the thermosetting material in the mold while thermosetting material is loaded into said pot means at said loading station by said loader means, and control means for detecting when the portion of a charge of the thermosetting material remaining in said pot means at the end of one cycle of operation of said apparatus and the thermosetting material added to said pot means by said loader means during a next succeeding cycle of operation of said apparatus equals a charge of a predetermined magnitude and for interrupting operation of said loader means in response to the detecting of a charge of the predetermined magnitude in said pot means.

2. A cyclically operable apparatus as set forth in claim 1 further including means for cooling the thermosetting material in said pot means during the loading of said pot means by said loader means.

3. A cyclically operable apparatus as set forth in claim 1 further including preheater means for heating the thermosetting material prior to loading of the thermosetting material into said pot means by said loader means.

4. An apparatus as set forth in claim 1 further including means applying pressure to the mold during the application of heat to the thermosetting material in the mold by said heater means, said means for moving said pot means between said loading and unloading stations also including means for moving said means for applying pressure from an inactive position disposed to one side of said unloading station to said unloading station simultaneously with movement of said pot means from the unloading station to the loading station.

5. An apparatus as set forth in claim 1 further including means at said unloading station for cooling the thermosetting material in said pot means during the heating of the thermosetting material in the mold by said heater means.

6. An apparatus as set forth in claim 5 further including preheater means for preheating the thermosetting material to a temperature below its setting temperature prior to loading of the thermosetting material into said pot means by said loader means, said means for cooling the thermosetting material being effective to maintain the preheated thermosetting material in said pot means at a temperature below the setting temperature of the preheated thermosetting material during heating of the thermosetting material in the mold by said heater means.

7. A cyclically operable apparatus for forming molded articles from molding material, said apparatus comprising pot means for holding a charge of the molding material, said pot means having at least one discharge opening through which the molding material may pass from said pot means into a mold, loader means for loading at least a portion of a charge of the molding material into said pot means during each cycle of a plurality of cycles of operation of said apparatus, said loader means being located at a loading station spaced apart from the mold, means for forcing a portion of a charge of the molding material to flow through said discharge opening and for enabling another portion of the charge to remain in said pot means during each cycle of a plurality of cycles of operation of said apparatus, said means for forcing a portion of a charge to flow through said discharge opening being located at an unloading station adjacent the mold and spaced apart from said loading station, means for moving said pot means relative to the mold between said loading and unloading stations on each cycle of operation of said apparatus, and control means for detecting when the portion of a charge of the molding material remaining in said pot means at the end of one cycle of operation of said apparatus and the molding material added to said pot means by said loader means during a next succeeding cycle of operation of said apparatus equals a charge of a predetermined magnitude and for interrupting operation of said loader means in response to the detecting of a charge of the predetermined magnitude in said pot means.

8. A cyclically operable apparatus for forming molded articles from molding material, said apparatus comprising pot means defining a cavity for holding a charge of the molding material, said pot means having at least one discharge opening through which the molding material may pass from said pot means into a mold, loader means for loading at least a portion of a charge of the molding material into said pot means during each cycle of a plurality of cycles of operation of said apparatus, said loader means including a member movable through a variable length operating stroke from a first position spaced apart from the cavity in said pot means to a second position in which said member extends into the cavity in said pot means and engages molding material in the cavity and means for moving said member through an operating stroke which varies in length as function of variations in the amount of molding material in the cavity of said pot means, means for forcing a portion of a charge of the molding material to flow through said discharge opening and for enabling another portion of the charge to remain in said pot means during each cycle of the plurality of cycles of operation of said apparatus, and control means for detecting when the portion of a charge of the molding material remaining in said pot means at the end of one cycle of operation of said apparatus and the molding material added to said pot means by said loader means during a next succeeding cycle of operation of said apparatus equals a charge of a predetermined magnitude, said control means including means for detecting when said member is moved through an operating stroke of a predetermined length and for interrupting operation of said loader means in response to movement of said member through an operating stroke of said predetermined length.

9. An apparatus as set forth in claim 8 wherein said loader means is located at a loading station disposed to one side of the mold, said means for forcing a portion of a charge of the molding material to flow through the discharge opening being located at an unloading station which is adjacent to the mold and spaced apart from said loading station, said apparatus further including means for moving said pot means between the loading and unloading stations during each cycle of operation of said apparatus.

10. A cyclically operable apparatus for forming molded articles from an elongated strip of material, said apparatus comprising pot means for receiving a charge of the strip material, said pot means having at least one discharge opening through which material may pass from said pot means into a mold, loader means for loading at least a portion of a charge of material into said pot means during each cycle of plurality of cycles of operation of said apparatus, said loader means including means for severing a plurality of relatively short pieces of material from the elongated strip of material and depositing the relatively short pieces of material in said pot means, means for forcing a portion of a charge of material to flow through said discharge opening and for enabling another portion of the charge to remain in said pot means during each cycle of a plurality of cycles of operation of said apparatus, and control means for detecting when the portion of a charge of material remaining in said pot means at the end of one cycle of operation of said apparatus and the relatively short pieces of material added to said pot means by said loader means during a next succeeding cycle of operation of said apparatus equals a charge of a predetermined magnitude and for interrupting operation of said loader means in response to the detecting of a charge of the predetermined magnitude in said pot means.

11. An apparatus as set forth in claim 10 wherein said means for severing a plurality of relatively short pieces of material from the elongated strip of material includes piston means which cooperates with said pot means to sever the elongated strip of material.

12. An apparatus as set forth in claim 10 wherein said pot means includes surface means for defining a cavity, said means for severing a plurality of relatively short pieces of material from the elongated strip including a first piston, means for effecting relative movement between said pot means and first piston to effect operation of said loader means between a first condition in which said first piston is spaced apart from said pot means and a second condition in which said first piston extends into the cavity in said pot means, and means for locating a portion of the elongated strip of material across an opening to the cavity in said pot means prior to operation of said loader means from the first condition to the second condition.

13. An apparatus as set forth in claim 12 wherein said means for forcing a portion of a charge of material to flow through said discharge opening includes a second piston and means for effecting relative movement between said second piston and said pot means to enable operation of said apparatus to be operated between a condition in which said second piston is spaced apart from said pot means and a condition in which said second piston extends into the cavity in said second pot means.

* * * * *